Oct. 4, 1932.  C. J. ZINKE  1,880,651
WEIGHING SCALE
Filed Feb. 13, 1931  2 Sheets-Sheet 1
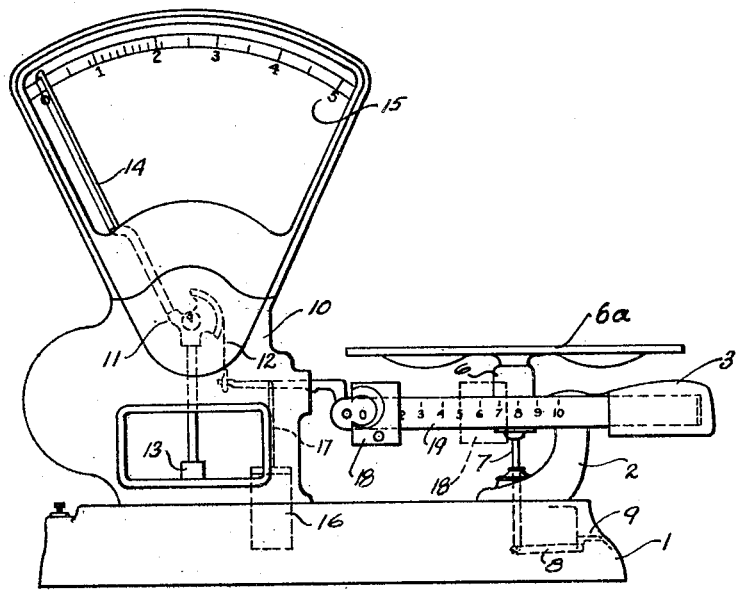
Fig—I
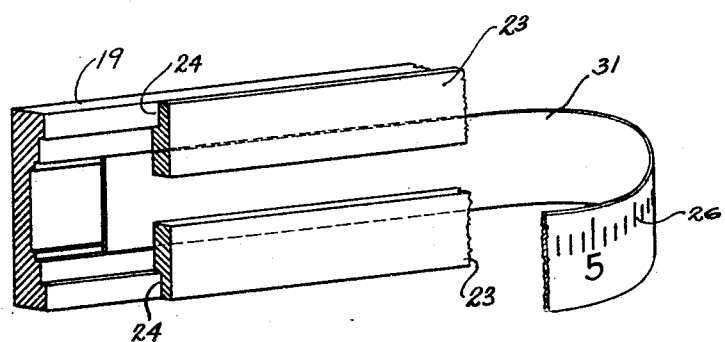
Fig—IV
Carl J. Zinke
INVENTOR
BY *[signature]*
ATTORNEY Oct. 4, 1932.         C. J. ZINKE         1,880,651
WEIGHING SCALE
Filed Feb. 13, 1931        2 Sheets-Sheet 2
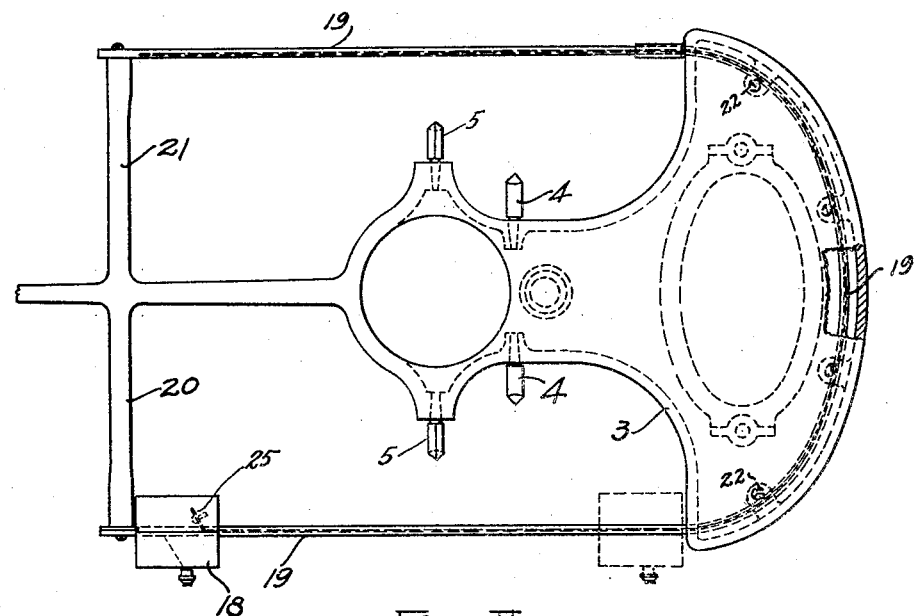
Fig-II
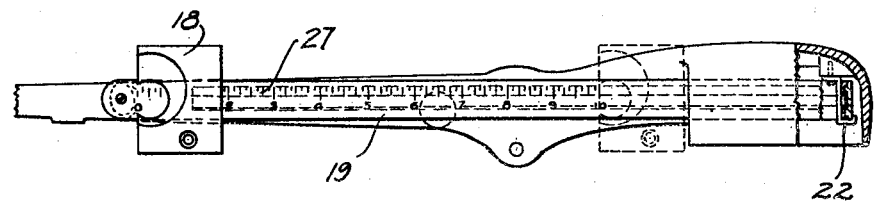
Fig-III
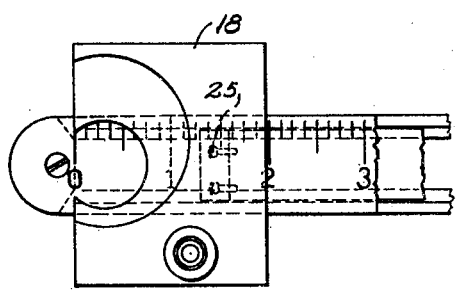
Fig-V
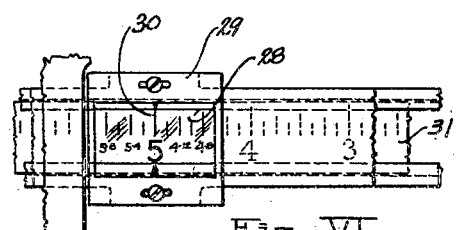
Fig-VI
Carl J. Zinke
INVENTOR
BY Marshall
ATTORNEY Patented Oct. 4, 1932

1,880,651

UNITED STATES PATENT OFFICE

CARL J. ZINKE, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed February 13, 1931. Serial No. 515,543.

This invention relates to weighing scales and especially to scales such as are used in retail shops and are equipped with a tare beam on the merchant's side of the scale.

The principal object of this invention is the provision of means for visibly indicating to the customer the amount of a load counterbalanced by a sliding tare poise.

Another object of this invention is the provision of improved means which permit attachment of the improvement, through an interchange of the lever only, to such scales as are already in use.

Still another object of the invention is an improved means for indicating, without lost motion, the position of a poise, on the opposite side of the scale.

These and other objects and advantages will be apparent from the following description in which reference is had to the accompanying drawings and in which similar reference numerals indicate similar parts throughout the several views.

In the drawings:—

Figure I is a front elevational view of a scale of well known type embodying my invention.

Figure II is an enlarged plan view, with parts broken away of a lever illustrating an embodiment of my invention.

Figure III is a side elevational view with portions broken away, of the above referred to lever.

Figure IV is an enlarged fragmentary view of a scale beam showing the indicating slide.

Figure V is an enlarged fragmentary view of the merchant's indicating hand showing the tare poise; and Figure VI is an enlarged fragmentary view of the customer's indication.

As the scale to which I have shown the embodiment of my invention attached is of well known type, I will not describe it in greater detail than is necessary to fully describe the invention.

Referring to the drawings in detail, a base 1 preferably in the form of a rigid iron casting, supports near one of its ends a base horn 2 upon which a lever 3 is supported by means of suitable fulcrum pivots 4. A pair of load pivots 5 extend laterally from the lever 3 and carry a load supporting spider 6. This spider supports a load receiver 6a upon which the loads to be weighed are deposited. A spider stem 7 is fastened to the spider 6 and extends downwardly into the hollow portion of the base 1. A check link 8 pivotally engages the stem 7 at one of its ends; the other end being pivotally joined to a stationary part 9, adjustably attached to the base. This check link mechanism is for the purpose of maintaining the condition of level of the load receiver. The nose portion of the lever extends into the interior of a housing 10 in which a load counterbalancing pendulum 11 is pivotally supported. A connection 12 connects the load receiving mechanism to the pendulum 11, which due to the effect of a load, is swung outwardly until the movement of the pendulum weight 13 counterbalances the effect of the load. As the angle of movement of the pendulum is always in direct proportion to the weight of the load on the receiver, an indicator 14, attached to the pendulum 11, co-operates with the chart 15 stationed within the housing to invariably indicate the weight of the load. A dash pot 16 is secured to the base and co-operates with a plunger 17 pivotally connected to and depending from the lever to damp the vibrations of the mechanism.

For the purpose of counterbalancing the weight of a container so that the indicator will only indicate the net weight when filled with a commodity; or to augment the automatic capacity of the scale, a tare poise 18 is provided. This tare poise is slidably mounted on a beam 19 which is substantially in the form of a U. The two ends of this beam are secured to laterally extending arms 20 and 21 of the lever 3, while the bight of the U is disposed underneath a canopy-like portion of the lever and is retained there by clips 22 which prevent all movement or displacement. The beam 19 is formed from a single strip of material which is preferably rolled to the contour clearly shown by Figure IV. When the two strips 23 are secured to the beam 19 at the points 24 by welding, a narrow rectangular channel is formed to receive a flexible metallic ribbon 31 preferably of stainless steel or spring brass, one end of which is secured at 25 to the poise 18. The other end of this ribbon is provided with a series of graduations 26. These graduations are a counter-part of the series of graduations 27 which appear on the merchant's side of the track and indicate to the merchant the amount of weight offset by the poise. The series of graduations on the metallic ribbon are visible to the customer through an opening 28 in the beam 19. This opening is covered by an escutcheon frame 29 to which an index 30 is fastened to point out the proper indicia which indicates to the customer the amount of weight counterbalanced by the poise on the merchant's side of the scale. The opening may be covered by a pane of glass or for the purpose of expediting the observation of the indication, a small magnifying lens may take its place. The escutcheon frame 29 with the index 30 is preferably provided with a lateral adjustment.

When it is desired to increase the weighing capacity of the scale, for example, 5 lbs., the poise 18 is moved to the indicia the position indicated by the dotted lines in Figure I. The flexible ribbon 31 in the rectangular channel being integrally secured to the poise is forced to partake the same amount of movement as the poise on the beam and a figure 5 and graduation will appear under the index in the opening 29, on the opposite side of the scale, thus indicating to the customer that portion of the load counterbalanced by the poise, and permitting him to check the amount of the commodity being weighed.

The construction hereinbefore described is simple and inexpensive to manufacture and is well adapted to fulfill the objects primarily stated. It is to be understood, however, that it is the intention to apply it to various types of scales; and that it is subject to variation, modification and change within the meaning and scope of the subjoined claims.

Having described my invention, I claim:

1. In a device of the class described, in combination, automatic weighing and indicating mechanism and manipulative load counterbalancing mechanism cooperating therewith, a graduated member, said manipulative load counterbalancing mechanism co-operating with said graduated member and a flexible member attached to said manipulative load-counterbalancing mechanism to indicate its position on said graduated member.

2. In a device of the type described, in combination, automatic load counterbalancing mechanism and manually operated load counterbalancing mechanism to augment said automatic load counterbalancing mechanism, said manually operated load counterbalancing mechanism including a poise and a track, said track having a channel and flexible means movable by said poise and movably stationed in said channel.

3. In a device of the class described, automatic weighing mechanism comprising a load supporting lever mechanism and manually operated load offsetting means secured to said lever including two substantially parallel tracks, a poise on one of said tracks and a flexible graduated member secured to said poise and adapted to indicate its position on the other said track.

4. A poise and beam mechanism for weighing scales comprising a lever, a beam attached to said lever on either side, parallel with its longitudinal axis, one of said beams having a series of weight graduations, a sliding poise mounted thereon, a flexible member bearing a series of graduations attached to said poise, said graduated flexible member being adapted to be actuated by said sliding poise and cooperate with the other said beam to indicate the position of said poise on said first beam.

5. A poise and beam mechanism for weighing scales comprising in combination, a lever, a substantially U shaped beam attached to said lever, the legs of said U shaped beam being substantially parallel and disposed on either side of the longitudinal axis thereof.

6. A poise and beam mechanism for force measuring machines comprising a lever, a substantially U shaped beam attached to said lever, the legs of said U shaped beam being substantially parallel and disposed on either side of the longitudinal axis thereof, said U shaped beam having a series of weight graduations on one of said legs, an index on the other said leg, a poise mounted on said leg bearing said series of graduations, a flexible member bearing a series of similar graduations attached to said poise and constrained to follow said U shaped beam and cooperate with the index on the other said leg to indicate the amount of load offset by said poise.

7. A poise and beam mechanism for weighing scales comprising in combination, a lever, a substantially U shaped beam, said U shaped beam having a runway adapted to receive a movable member.

8. A poise and beam mechanism for force measuring instruments comprising in combination, a lever, a substantially U shaped beam attached thereto, the legs of said U being located on either side of the longitudinal axis thereof, one of said legs bearing a series of weight graduations, a load offsetting poise movably stationed thereon; said U shaped beam having a substantially C shaped cross section, a flexible member bearing a series of similar weight graduations secured to said poise and slidably mounted within the bight of said C shaped beam and co-operating with an index on the other said leg to indicate the amount of force counterbalanced by said poise.

9. A poise and beam mechanism for force measuring instruments comprising in combination, a lever, a substantially U shaped beam attached thereto, the legs of said U being located on either side of the longitudinal axis thereof, one of said legs bearing a series of weight graduations, a load offsetting poise movably stationed thereon; said U shaped beam having a substantially C shaped cross section, a flexible member bearing a series of similar weight graduations secured to said poise and slidably mounted within the bight of said C shaped beam and a window in the closed side of said C shaped beam at a predetermined point for exposing said weight graduations on said flexible member to view.

10. A poise and beam mechanism for force measuring instruments comprising in combination, a lever, a substantially U shaped beam attached thereto, the legs of said U being located on either side of the longitudinal axis thereof, one of said legs bearing a series of weight graduations, a load off-setting poise movably stationed thereon; said U shaped beam having a substantially C shaped cross section, a flexible member bearing a series of similar weight graduations secured to said poise and slidably mounted within the bight of said C shaped beam, a window in the closed side of the C shaped beam at a predetermined point for exposing said weight graduations on said flexible member to view and an adjustable frame having an index surrounding said opening.

11. A poise and beam mechanism for force measuring instruments comprising in combination, a lever, a substantially U shaped beam attached thereto, the legs of said U being located on either side of the longitudinal axis thereof, one of said legs bearing a series of weight graduations, a load off-setting poise movably stationed there; said U shaped beam having a substantially C shaped cross section, a flexible member bearing a series of similar weight graduations secured to said poise and slidably mounted within the bight of sail C shaped beam, a window in the closed side of the C shaped beam at a predetermined point for exposing said weight graduations on said flexible member to view, an adjustable frame having an index surrounding said opening and a magnifying lens secured to said frame.

CARL J. ZINKE.